United States Patent
Lewis et al.

(10) Patent No.: US 10,328,860 B2
(45) Date of Patent: Jun. 25, 2019

(54) REAR DOOR SHELF WITH ONE TOUCH OPENING

(71) Applicant: Bestop, Inc., Louisville, CO (US)

(72) Inventors: Stephen J. Lewis, Harrison Township, MI (US); Jonathon Moore, Macomb Township, MI (US); Charles C. Turney, Toledo, OH (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/840,480

(22) Filed: Dec. 13, 2017

(65) Prior Publication Data

US 2018/0162284 A1 Jun. 14, 2018

Related U.S. Application Data

(60) Provisional application No. 62/434,108, filed on Dec. 14, 2016.

(51) Int. Cl.
| | |
|---|---|
| *F16M 11/00* | (2006.01) |
| *B60R 7/04* | (2006.01) |
| *B60J 5/10* | (2006.01) |
| *B60R 7/02* | (2006.01) |
| *B60R 11/00* | (2006.01) |

(52) U.S. Cl.
CPC .............. *B60R 7/046* (2013.01); *B60J 5/10* (2013.01); *B60J 5/105* (2013.01); *B60R 7/02* (2013.01); *B60R 2011/0021* (2013.01); *B60R 2011/0024* (2013.01); *B60R 2011/0082* (2013.01); *B60R 2011/0085* (2013.01)

(58) Field of Classification Search
CPC ............ B60J 5/00; B60J 5/101; B60N 2/3095
See application file for complete search history.

(56) References Cited

U.S. PATENT DOCUMENTS

| | | | | |
|---|---|---|---|---|
| 1,838,344 A | * | 12/1931 | Wilson .................... | B60R 5/041 296/26.11 |
| 3,406,999 A | * | 10/1968 | Kozicki .................... | B60P 3/36 296/156 |
| 4,848,498 A | * | 7/1989 | Hart .......................... | B60J 5/00 180/69.2 |
| 5,533,774 A | * | 7/1996 | Cavanaugh .......... | B60N 2/3095 296/66 |
| 6,227,594 B1 | * | 5/2001 | Pommeret ................ | B60J 5/101 296/37.1 |
| 6,502,885 B1 | | 1/2003 | Gammon et al. | |

FOREIGN PATENT DOCUMENTS

| | | |
|---|---|---|
| DE | 7112747 U | 7/1971 |
| DE | 19714497 A1 | 10/1998 |
| DE | 20019462 U1 | 2/2001 |
| WO | 9741755 A1 | 11/1997 |

OTHER PUBLICATIONS

International Search Report for International Application No. PCT/US2015/048318, dated Nov. 11, 2015.

* cited by examiner

*Primary Examiner* — Amy J. Sterling
(74) *Attorney, Agent, or Firm* — Warn Partners, P.C.

(57) ABSTRACT

A rear door shelf assembly having a mounting base portion and a shelf rotatably connected to the mounting base portion for moving between an open position and a closed position. A spring-loaded prop rod is rotatably connected to the assembly. Storage features are connectable to the prop rod to provide multi-functionality of the assembly as a utility table and a storage unit. A one-touch latching mechanism holds the shelf in the closed position.

31 Claims, 9 Drawing Sheets

REAR DOOR SHELF WITH ONE TOUCH OPENING

CROSS-REFERENCE TO RELATED APPLICATIONS

This application claims the benefit of U.S. Provisional Application No. 62/434,108, Filed Dec. 14, 2016. The disclosures of the above application are incorporated herein by reference.

FIELD OF THE INVENTION

The present invention relates to a mountable storage/shelf assembly with a rotatable shelf structure for use in automotive applications.

BACKGROUND OF THE INVENTION

Vehicles, such as sport utility vehicles (SUVs), have inward tailgate footprints that are underutilized and rear cargo areas that lack convenient and stowable shelving and storage. Typically, tailgates are just used for accessing the rear cargo area. There have been known attempts to attach components to the inward surface of the tailgate, but they are not multi-functional parts. Known shelves bracketed to the tailgate are also heavy (generally made of metal), and/or are not easily and quickly deployed, or do not provide a continuous, flat working surface. Known storage components attached to the tailgate are also heavy or do not stow when not in use. Such parts are generally bulky and take up more space. Metal shelving is known to be prone to rattling. Metal also adds to the weight of the vehicle, which is an ever increasing concern in the automotive industry where mileage efficiency is an issue. The shelves and storage are also known to be more open to elements, such as dust and dirt, even when not in use, since they do not provide a closed environment when not in use. All known shelving parts and storage parts lack in an option for multi-functionality, or do not have an original equipment manufacturer (OEM) factory appearance, or are not easily deployed, or are heavy.

There are a few other known ways to store items in the rear section of an SUV, e.g., rear cargo area, such as bulk containers and bags, which are not fastened in place to prevent sliding around or take up space when not in use and are not easily stowed, and nets, e.g., unstructured nets, fixed or attachable in the storage area, which have limited volume for storage and allows other items to get caught on or become entangled when loading items into the storage area or from items moving during transit.

Accordingly, there remains a need in the art for deployable/stowable rear shelving that has easy access and improved appearance and functionality.

SUMMARY OF THE INVENTION

A rear door shelf assembly including one-touch opening with a spring loaded prop rod. The shelf is multi-functional to provide a utility table or storage bin as desired. The prop rod has a selectively removable container, e.g., mesh crate, canvas bin, or any other suitable material and container for storage of items such as tools, groceries, camping gear, outdoor gear, etc. The shelf can function as a utility table for any item, e.g., tools, electronics, food/drink, gear, camping items, etc., the shelf also easily stows away when not in use. The shelf stows into a smaller footprint and has an improved OEM-like factory appearance. The shelf is connected to a rear door of the vehicle, such as to the inward surface of the tailgate of an SUV. No drill installation of the shelf assembly provides efficient installation without having to drill holes into the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-10 generally, there is provided a rear door shelf assembly shown generally at 100 operable for attachment to a vehicle, according to the present invention. The assembly 100 has at least one mounting portion or base 102 mounted to the vehicle, most preferably, mounted to an inside surface of the rear door 10. At least one shelf 104 is connected to the mounting portion 102 and movable between at least an open (or deployed) position and a closed (or stowed) position. The assembly 100 has easy access, one-touch shelf deployment for easy operation, preferably, spring-loaded one-touch opening.

Figure 1:
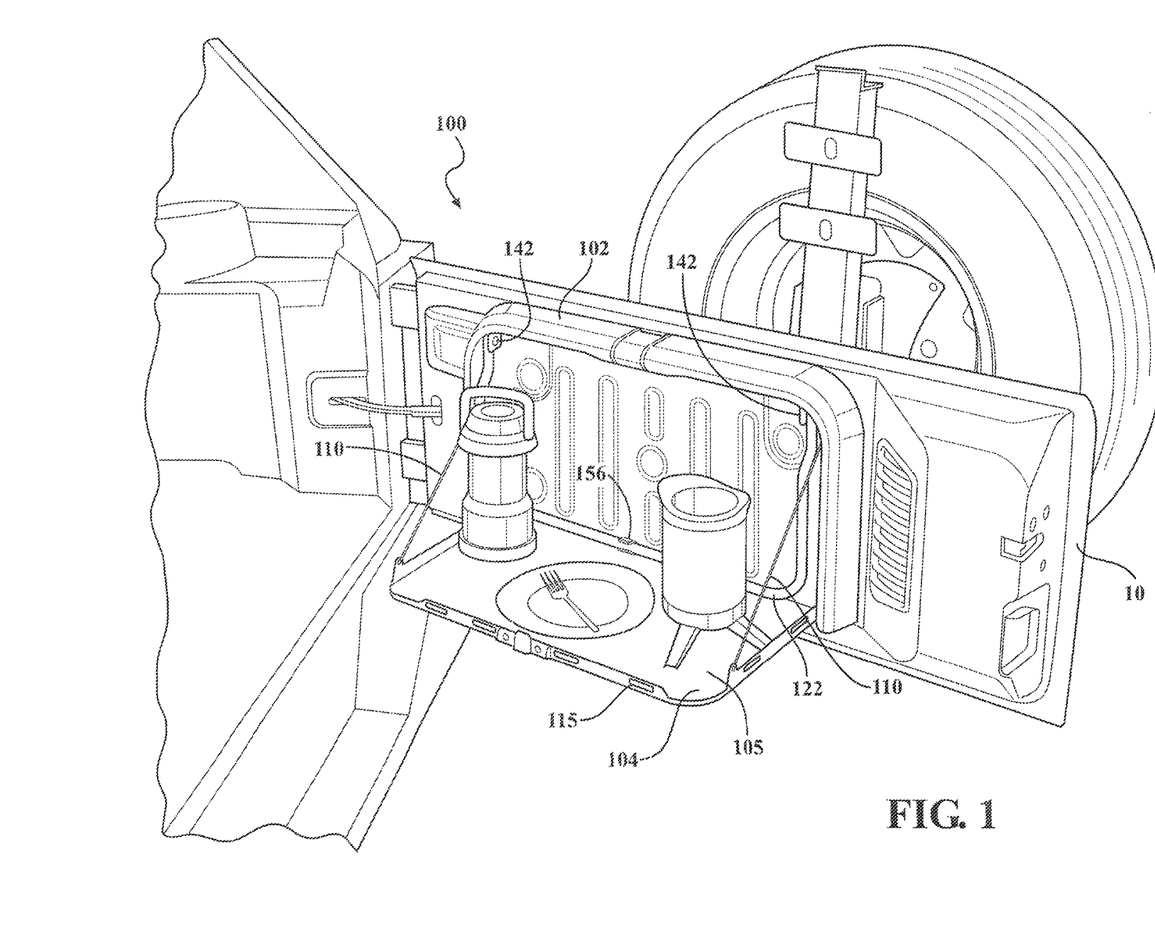
FIG. 1 is a perspective view of the rear door shelf assembly in an open position for use as a utility table or shelf, shown in an exemplary environment of use as mounted to a tailgate of a vehicle, accordance with the present invention.
Figure 2:
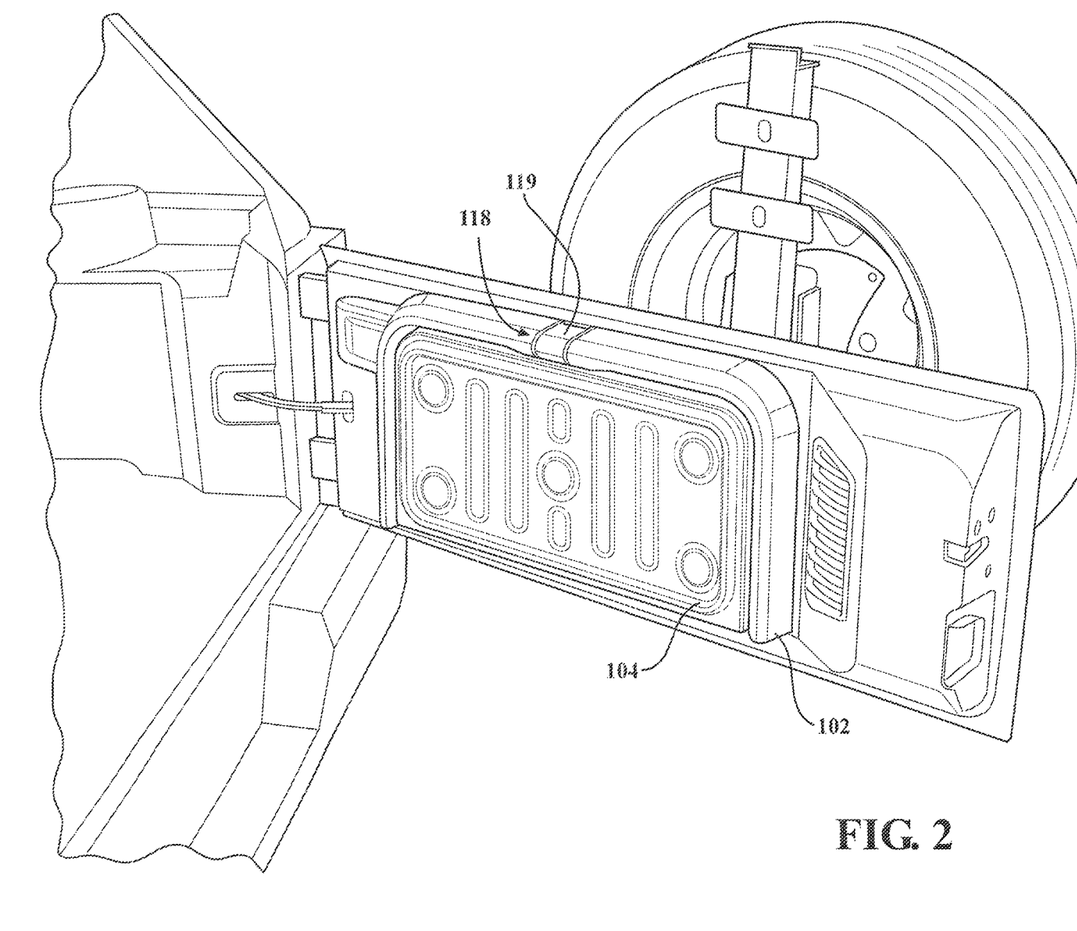
FIG. 2 is a perspective view of the rear door shelf assembly of FIG. 1 in a closed position for stowing, according to the present invention.
Figure 3:
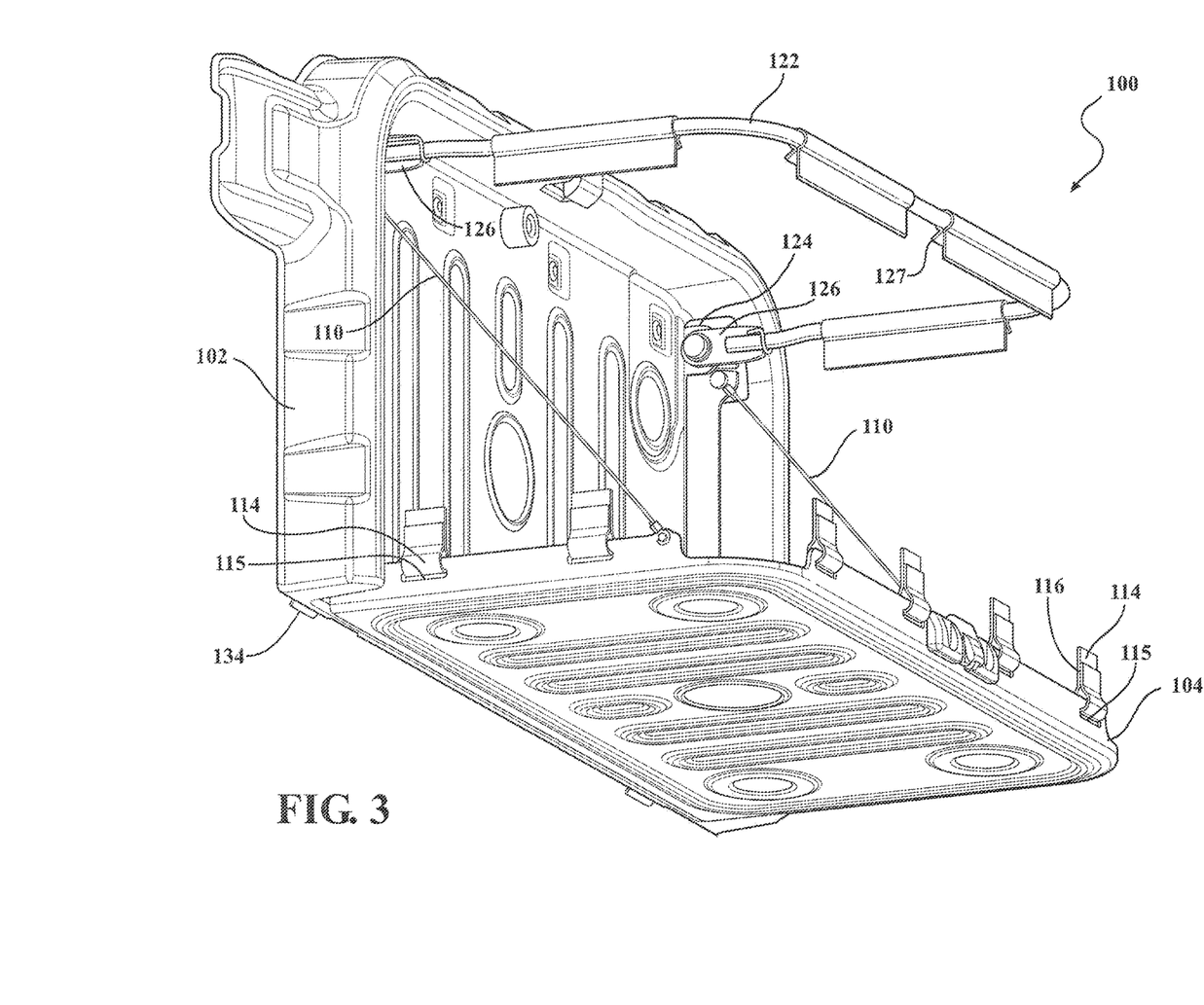
FIG. 3 is a front left hand perspective view of the rear door shelf assembly, according to the present invention.
Figure 4:
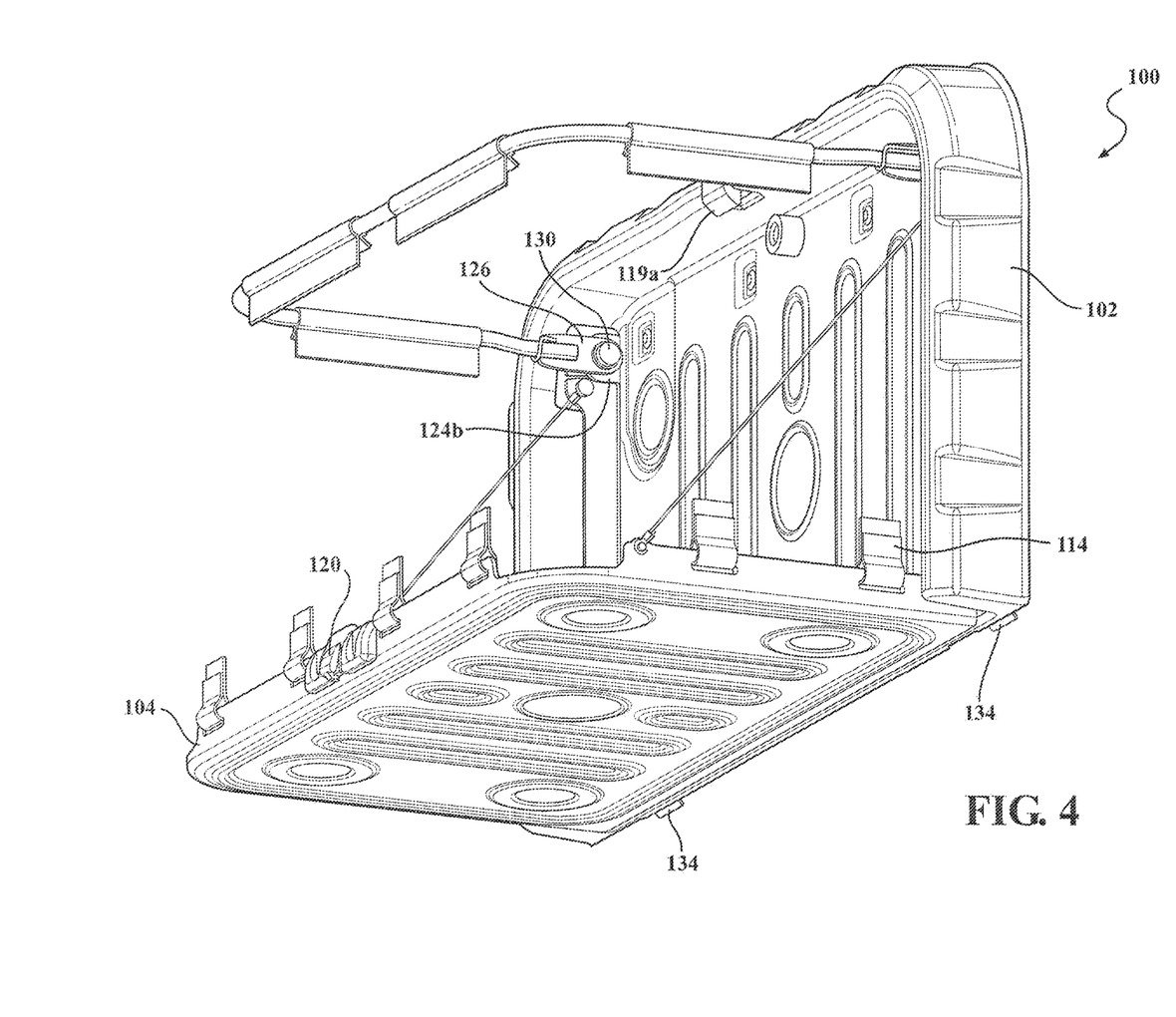
FIG. 4 is a front right hand perspective view of the rear door shelf assembly, according to the present invention.
Figure 5:
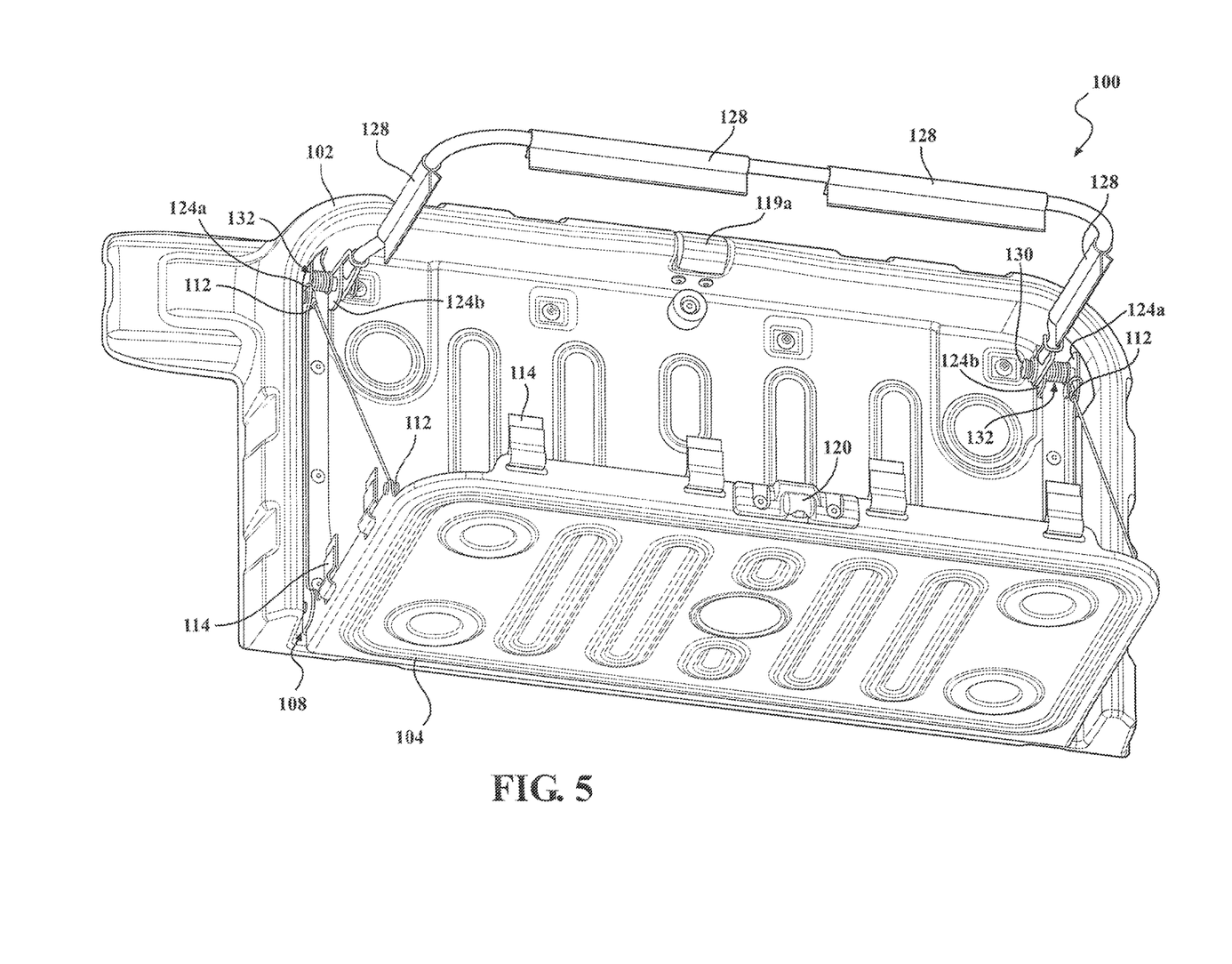
FIG. 5 is a front perspective view of the rear door shelf assembly, according to the present invention.
Figure 6:
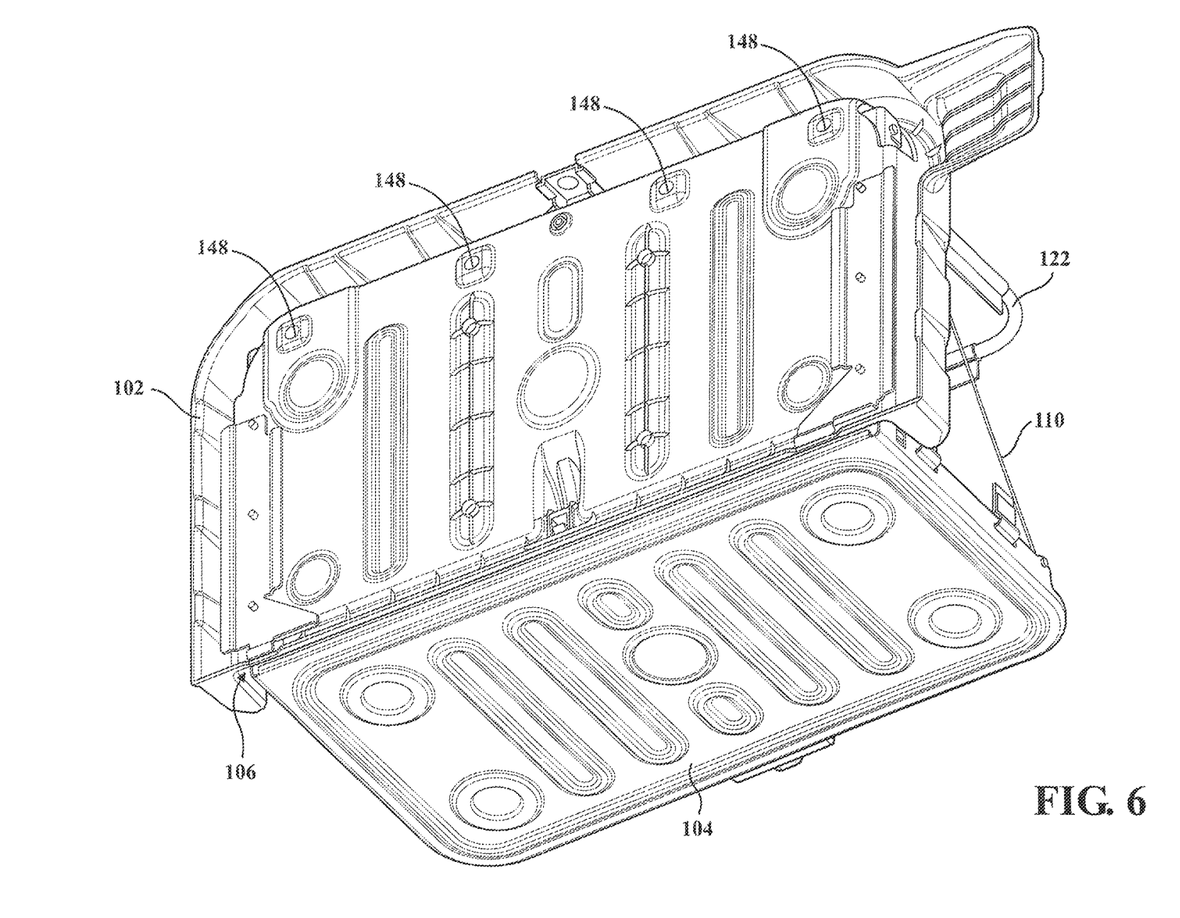
FIG. 6 is a bottom perspective view of the rear door shelf assembly, according to the present invention.

The assembly 100 is adaptable for multi-functionality as both a utility table and storage bin. FIG. 1 depicts an open position with the shelf 104 used as a utility table. FIG. 2 depicts the closed position.

Figure 9:
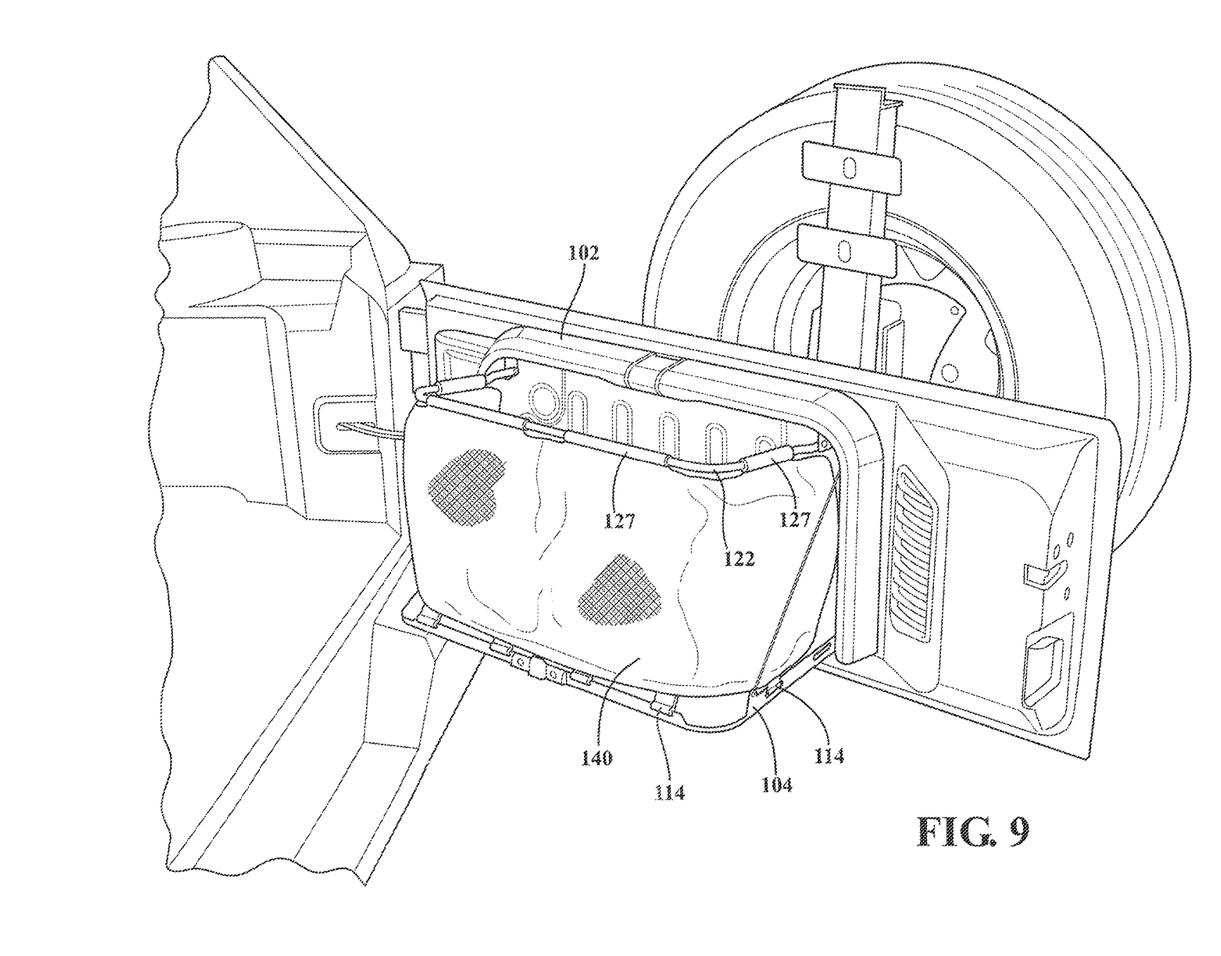
FIG. 9 is a perspective view of the rear door shelf assembly in an open position for use as a storage bin, in accordance with the present invention.

The shelf 104 is rotatable between the open and closed position about at least one joint, preferably, at least two joints shown generally at 106, 108. The open position provides a generally horizontal surface for the utility shelf. A storage feature could also be selectively used to provide the storage, such as a bin, crate, container, mesh bin, etc. FIG. 9 depicts a storage member 140 (e.g., mesh crate, container, bin, net, or any other suitable storage unit of any kind) connected to the shelf 104 and the shelf in the open position.

At least one pair of cords 110, alternatively webbing material or other suitable material, is connected to each side of the shelf 104 for setting the range of rotation of the shelf 104 and holding the shelf 104 in the open position. Both ends of each cord 110 is connected to the mounting portion 102 and shelf 104 with at least one fastener 112. FIGS. 3-6 depict the open position.

In the closed position, the shelf 104 preferably fits generally within the footprint of the mounting portion 102, providing a more compact and seamless OEM-type factory appearance. When in the closed position, the assembly 100 has a narrow profile. The depth of the assembly 100 when closed is, generally, less than 8 inches, typically, less than 6 inches, preferably about 4.5 inches or less.

In the open position, the shelf 104 extends outward from the vehicle a predetermined distance depending on the application. Generally, the shelf 104 extends at least 6 inches, typically, at least 10 inches, preferably, 10 to 20 inches, more preferably about 10-15 inches, most preferably, about 12 inches.

The assembly 100 withstands a predetermined weight of items on the shelf 104 depending on the application. The shelf holds up to, generally, about 15 to 50 lbs, typically, 20 to 40 lbs, preferably, 25-40 lbs, most preferably, up to about 35 lbs. Preferably, the base 102 and shelf are made of strong, durable material to withstand the loads, most preferably, a suitable polymer material.

The assembly 100 in the closed position is generally at least 15 inches long, typically, at least 20 inches long, preferably about 20 to 28 inches long, most preferably, about 25 inches long.

The assembly 100 in the closed position is generally at least 10 inches high, typically, at least 12 inches high, preferably about 10-16 inches high, most preferably, about 14 inches high.

The storage member 140 has at least one attachment member 114, preferably a plurality of attachment members 114, connectable to the shelf 104 by at least one aperture 115, preferably a plurality of apertures 114, to connect the storage member 140 to the shelf 104. The attachment member 114 is preferably a strap fastened (e.g., sewn, adhered, and/or hook/loop fastened, etc) toward the bottom of the storage member 140. One end of the attachment member 114 is looped through the aperture 115 and the ends of the attachment member 114 are selectively fastened together, indicated at 116, preferably, by at least one fastener (e.g., with a snap and/or hook/loop fastened, or any other suitable fastener). The figures depict four attachment members 114 and four apertures on the front of the shelf 104 and two of each on both sides of the shelf 104, however, more or less attachment members 114 and corresponding apertures 115 are contemplated depending on the application without departure from the scope of the present invention.

Preferably, the assembly 100 has easy access, one-touch shelf deployment for easy operation, most preferably, a spring-loaded or detent one-touch opening is provided. At least one latch mechanism shown generally at 118 is provided with a release tab 119 on the base 102 that connects a catch feature 120 on the shelf 104 to close the shelf 104. It is understood that alternatively, the tab 119 is on the shelf 104 and the catch 120 is on the base 102. The latch mechanism 118 is a quick one-touch release, which by pressing the release tab 119 allows the shelf 104 to rotate down. The latch mechanism tab 119 tab is pressed to release the catch 120 from under the latching portion 119a to allow the shelf to rotate down. As the shelf 104 is rotated to the open position at least one prop rod 122 that is biased automatically rotates upward (or downward depending on the application).

The figures show one latch mechanism 118, however, more are contemplated without departure from the present invention. Alternative latching mechanisms or guides or webs with snaps, or any other feature(s) suitable for keeping the shelf in the closed position, are also contemplated without departure from the scope of the present invention.

The prop rod 122 is rotatably connected to the mounting portion 102 or to the shelf 104, most preferably, to the base 102, and is biased. Preferably, a pair of brackets 124 are connected to the base 102. Each bracket 124 has opposing mounting portions 124a, 124b to connect a mounting plate 126 at the ends of the prop rod 122 to the mounting portions 124a, 124b using a fastener 130, e.g., pin, extending through apertures of the prop rod mounting plate 126 and mounting portions 124a, 124b. A biasing member shown generally at 132, e.g., spring, is coupled to the fastener 130 and to the prop rod 122. When the shelf 104 is moving to the open position the prop rod 122 rotates to the deployed position shown in FIGS. 3-6 and 9-10. The prop rod 122 is spring-loaded toward both ends to deploy, indicated by spring generally at 132. To rotate the shelf 104 to the closed position, the prop rod 122 is manually pushed to overcome the bias and rotate back to the stowed position for the shelf 104 to then be rotated upward to the stored position and latched at the latching mechanism 118. Any other bias spring structure suitable for rotating the prop rod 122 depending on the application is contemplated without departure from the scope of the present invention. Additional prop rods 122 and/or different shaped prop rods 122 are contemplated without departure from the scope of the present invention.

At least one retainer 128, preferably a plurality of retainers, are provided on the prop rod 122 for selectively attaching the storage member 140 to the prop rod 122. The retainer 128 is connected to the storage member 140, e.g., sewn, adhered, at least one fastener, etc. One end of the retainer is looped around the prop rod 122 and the ends of the retainer 128 are fastened together, indicated at 127, preferably, by at least one fastener (e.g., with a snap and/or hook/loop fastened, or any other suitable fastener). The figures depict four retainers 128 on the prop rod 122, however, more or less four are contemplated depending on the application without departure from the scope of the present invention.

When desired, the attachment members 114 may be unfastened and removed from the shelf 104 for allowing folding of the storage member 140 with the prop rod 122 against the base 102 to provide access to the top working surface 105 of the utility shelf 104 in the utility table mode. When desired, the attachment members 114 may be unfastened and removed from the shelf 104, the second attachment members 128 may be unfastened and removed from the prop rod 122, and the fasteners 142 unfastened from the base 102 for removing the entire storage member 140 from the assembly 100 to provide access to the working surface 105 the utility shelf 104 working surface 105. Alternatively, the attachment members 114 may be unfastened and removed from the shelf 104 and the prop rod 122 removed from the base 102, e.g., remove the prop rod 122 from the bracket 126 or bias member 132 for removing the entire storage member 140 from the prop rod, e.g., slide off an end of the rod 122. The prop rod 122 is rotatable downward to lie generally flat parallel to the base 102 and can be held by at least one retainer 156, e.g., c-shaped retainer, web strap with a snap, tab, locking mechanism or any other suitable retainer to keep the prop rod 122 generally collapsed against the base 102 to allow unobstructed access for use of the shelf 104 in the open position or utility table mode. According to an embodiment of the present invention, the fastener is a 130 is a pull pin to selectively release the bracket 126/rod 122.

Figure 8:
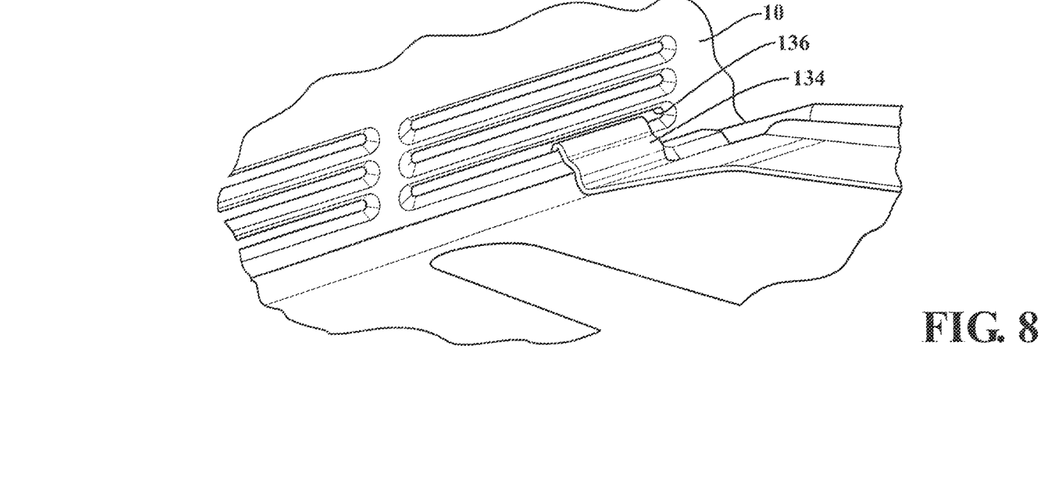
FIG. 8 is a perspective view of a tab of the rear door shelf assembly for mounting the rear door shelf assembly to an aperture in the tailgate of the vehicle, according to the present invention.

Referring now to FIG. 8, at least one attachment feature 134, e.g., tab, metal tab or any suitable fastener, is provided toward the lower back of the base 102 to connect to the mounting surface of the vehicle 10. Most preferably, at least two tabs 134 are provided on the assembly 100 and each is aligned with and inserted into respective apertures 136, OEM slots formed on the inner surface of the tailgate, to connect the bottom portion of the assembly 100 to the vehicle 10. With the tabs 134 in place within the apertures 136, the assembly 100 is pivoted upward and into place against the vehicle 10.

Figure 7:
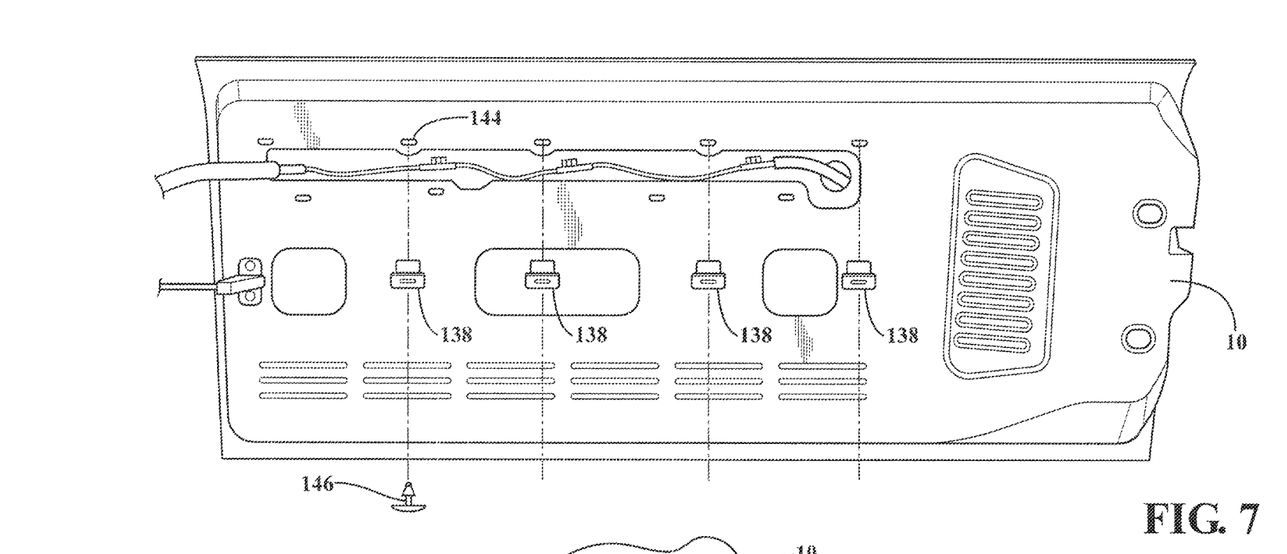
FIG. 7 is a front elevation view of a plurality of plugs of the rear door shelf assembly for mounting the rear door shelf assembly to a plurality of apertures in a tailgate of the vehicle, according to the present invention.

Referring now to FIG. 7, at least one attachment feature 138, e.g., plug, is provided toward the upper back of the base 102 to connect to the mounting surface of the vehicle 10. Most preferably, at least four plugs 138 are provided on the assembly 100 and each is aligned with and inserted into respective apertures 144, OEM slots formed on the inner surface of the tailgate, to connect the upper portion of the assembly 100 to the vehicle 10. With the plugs 138 in place within the apertures 144, the assembly 100 is pivoted upward and into place against the vehicle 10. A plurality of fasteners 146, e.g., screws, rivets, bolts and washers, etc, preferably, screws, are inserted into a plurality of apertures 146, respectively, formed in the base 102, and into the plugs 138 inserted into the apertures 144 formed in the vehicle to connect the assembly 100 to the vehicle component, e.g., tailgate. The tab 134 and plug 138 arrangement allow for an advantageous no-drill installation of the assembly 100 using existing features on the vehicle 10.

Figure 10:
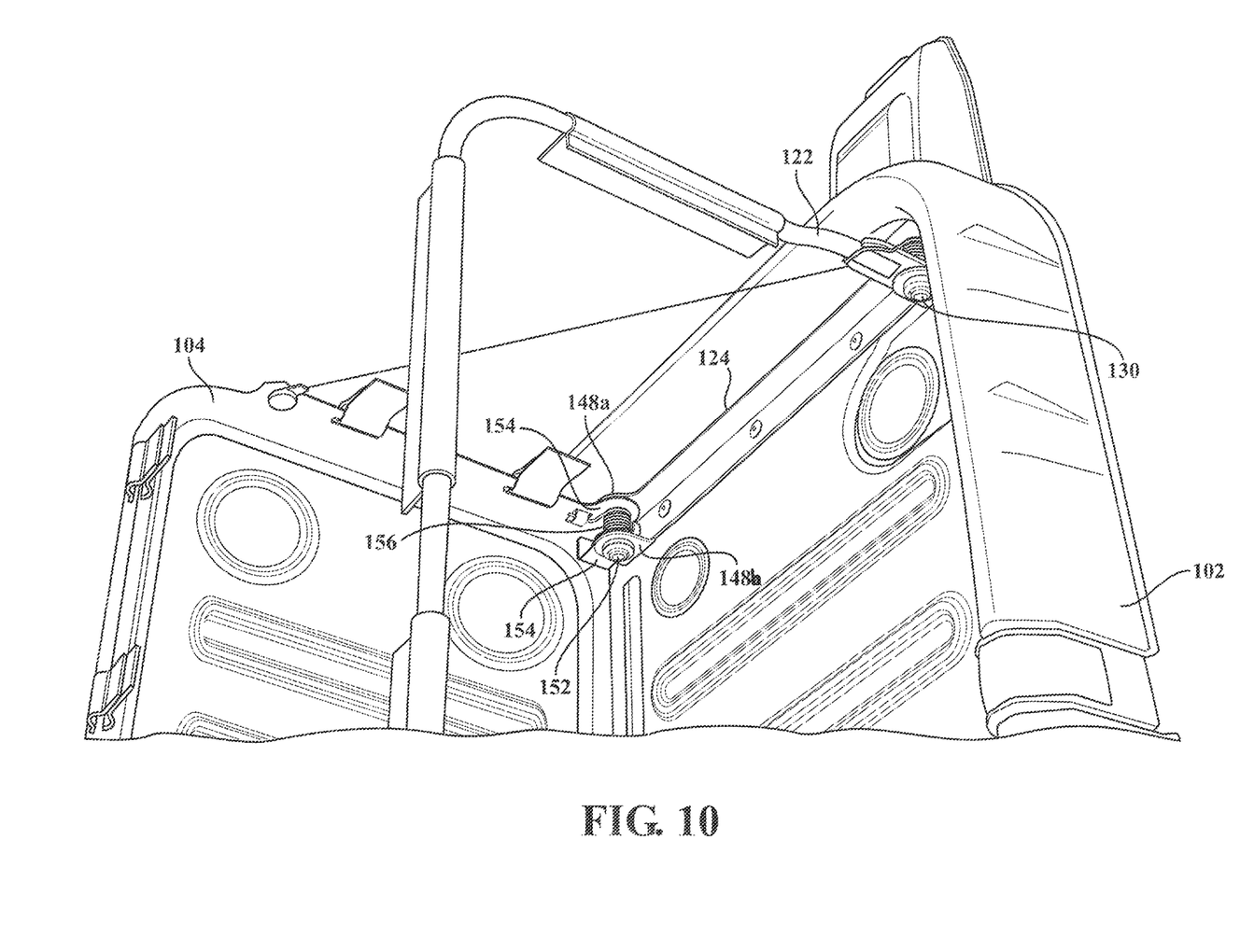
FIG. 10 is an enlarged perspective view of a joint of the rear door shelf assembly connecting a shelf to a base.

Referring now to FIG. 10, the assembly provides a spring dampened shelf 104 fold down. Each bracket 124 has opposing lower mounting portions 148a, 148b to connect a mounting bracket 154 of the shelf 104 to the base 102 at the joint portions 106, 108 using a fastener 152, e.g., pin, extending through apertures of the shelf mounting bracket portions 154, 154 and opposing lower mounting portions 148a, 148b. A biasing member 156, e.g., spring, is coupled to the fastener 152 and to the mounting bracket 154. Any other biasing structure suitable for dampening the shelf 104 depending on the application is contemplated without departure from the scope of the present invention.

Referring to the figures generally, the support structure for the container can be held against the base 102 by at least one fastener, e.g, strap with snaps, hook and loop straps, etc, when an unobstructed utility shelf 105 surface is desired. It is contemplated that the storage unit could include at least one divider for storage of items within each compartment defined by the divider(s). It is further contemplated that the assembly 100 could simultaneously function as both a utility table and a storage bin by attaching a container of shorter length to the rod leaving open space for the remainder of the shelf to function as a utility table.

The shelf 104 and base 102 are generally solid without holes extending through exposed surfaces of either in the installed position to provide a substantially closed environment when the shelf 104 is stowed.

It is contemplated that the assembly 100 is adapted for connecting to any vehicle door, including the rear door and either front side door and/or rear side doors, depending on the particular application without departure from the present invention.

It is contemplated that the assembly 100 is lockable for added security without departure from the present invention.

It is contemplated that at least one seal is provided in sealing engagement for providing a weather resistant seal of the assembly 100, e.g., with respect to the shelf 104 against the base 102 when closed.

According to an aspect of the present invention, the rear door shelf assembly 100 has one touch release with spring loaded prop rod and spring dampened shelf fold down.

While the assembly 100 is shown installed to an inner surface of a rear tailgate of an SUV, it is understood that the assembly 100 is adaptable for mounting to any rear door of an SUV or any other surface in a cargo area or in back of passenger seating or passenger door of an SUV or any other type of vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A door shelf assembly for a vehicle, comprising:
   at least one mounting base portion operably connected to the vehicle;
   at least one shelf rotatably connected to the mounting base portion and moveable between at least an open position and stowed position, said at least one shelf fitting within a footprint of said at least one mounting base portion when in the stowed position;
   a prop rod that is spring loaded to automatically deploy when selectively released from a retainer when said at least one shelf is rotated to said open position; and
   wherein rotating the shelf to the open position selectively provides a utility shelf or storage bin, when desired.

2. The door shelf assembly of claim 1, further comprising a latch mechanism for one-touch deployment to said open position.

3. The door shelf assembly of claim 1, wherein said prop rod is operably biased to automatically deploy when not held by said retainer, said prop rod including at least one storage bin operably connected to said prop rod that expands with deployment of the prop rod.

4. The door shelf assembly of claim 1, wherein said prop rod is operably rotatably connected to said mounting base portion and operably coupled to biasing members to automatically deploy said prop rod when not held within said retainer when said at least one shelf is rotated to said open position.

5. The door shelf assembly of claim 1, further comprising at least one storage member, said storage member selectively removable from said door shelf assembly to expose a top surface of said at least one shelf for a utility shelf mode.

6. The door shelf assembly of claim 1, wherein said door shelf assembly in the stowed position has a narrow profile of not more than about 6 inches in depth.

7. The door shelf assembly of claim 1, wherein in the open position the at least one shelf extends outward at least about 10 inches.

8. The door shelf assembly of claim 1, wherein said door shelf assembly holds at least about 35 pounds when in said open position.

9. The door shelf assembly of claim 1, wherein said at least one shelf and at least one mounting base portion is formed of a strong, durable polymer material.

10. The door shelf assembly of claim 1, further comprising a plurality of attachment members to selectively attach a storage container of said door shelf assembly to said at least one shelf.

11. The door shelf assembly of claim 1, further comprising at least one latch mechanism including a one-touch release tab on said at least one shelf or said at least one mounting base portion and a catch on the other of said at least one shelf or said at least one mounting base portion.

12. The door shelf assembly of claim 1, further comprising at least two tabs inserted into at least two apertures, respectively, provided in a surface of said vehicle for mounting the door shelf assembly to the vehicle.

13. The door shelf assembly of claim 1, further comprising at least one plug inserted into at least one aperture provided in a surface of said vehicle for mounting the door shelf assembly to the vehicle.

14. The door shelf assembly of claim 1, wherein said door shelf assembly provides no-drill installation, said door shelf assembly further comprising:
   a plurality of tabs insertable into a plurality of apertures, respectively, provided on an inward tailgate surface of said vehicle;
   a plurality of plugs insertable into a plurality of second apertures, respectively, provided on an inward tailgate surface of said vehicle;
   providing a plurality of fasteners;
   wherein inserting said plurality of tabs into said plurality of apertures partially mounts said mounting base portion to said tailgate surface, and
   wherein with said plurality of plugs inserted into said plurality of second apertures, a plurality of third apertures formed in said at least one mounting base portion are aligned with said plurality of plugs and said plurality of fasteners extend into said plurality of third apertures and into said plurality of plugs to mount said door shelf assembly to said tailgate of said vehicle.

15. The door shelf assembly of claim 1, wherein said at least one shelf and at least one mounting base portion providing a closed environment when not in use.

16. The door shelf assembly of claim 1, wherein said at least one shelf is a spring dampened shelf.

17. A rear door shelf assembly for a tailgate of a vehicle, comprising:
   at least one mounting base portion including a plurality of tabs and attachment features to mount said mounting base portion to an inward surface of said tailgate without drilling holes into said tailgate;
   at least one shelf rotatably connected to the mounting base portion and moveable between at least an open position and stowed position, said at least one shelf fitting within a footprint of said at least one mounting base portion when in the stowed position, wherein rotating the at least one shelf to said open position provides a substantially horizontal surface for use as a utility table or storage;
   at least one selectively removable storage container storage operably connected to said at least one shelf;
   at least one prop rod operably rotatably connected to said at least one mounting portion and having at least one biasing member, said storage container operably connected to said at least one prop rod; and
   a latching mechanism with a one touch release button for automatic deployment of said at least one shelf and at least one prop rod to said open position, when desired.

18. A door shelf assembly for a vehicle, comprising:
   at least one mounting base portion operably connected to the vehicle;
   at least one shelf rotatably connected to the mounting base portion and moveable between at least an open position and stowed position, said at least one shelf fitting within a footprint of said at least one mounting base portion when in the stowed position; and
   at least one latch mechanism including a one-touch release tab on said at least one shelf or said at least one mounting base portion and a catch on the other of said at least one shelf or said at least one mounting base portion;
   wherein rotating the shelf to the open position selectively provides a utility shelf or storage bin, when desired.

19. The door shelf assembly of claim 18, further comprising a prop rod that is operably biased to automatically deploy when not held by said retainer, said prop rod including at least one storage bin operably connected to said prop rod that expands with deployment of the prop rod.

20. The door shelf assembly of claim 18, further comprising at least one storage member, said storage member selectively removable from said door shelf assembly to expose a top surface of said at least one shelf for a utility shelf mode.

21. The door shelf assembly of claim 18, wherein said at least one shelf and at least one mounting base portion is formed of a strong, durable polymer material.

22. The door shelf assembly of claim 18, further comprising at least two tabs inserted into at least two apertures, respectively, provided in a surface of said vehicle for mounting the door shelf assembly to the vehicle.

23. The door shelf assembly of claim 18, further comprising at least one plug inserted into at least one aperture provided in a surface of said vehicle for mounting the door shelf assembly to the vehicle.

24. The door shelf assembly of claim 18, wherein said door shelf assembly provides no-drill installation, said door shelf assembly further comprising:
   a plurality of tabs insertable into a plurality of apertures, respectively, provided on an inward tailgate surface of said vehicle;
   a plurality of plugs insertable into a plurality of second apertures, respectively, provided on an inward tailgate surface of said vehicle;
   providing a plurality of fasteners;
   wherein inserting said plurality of tabs into said plurality of apertures partially mounts said mounting base portion to said tailgate surface, and
   wherein with said plurality of plugs inserted into said plurality of second apertures, a plurality of third apertures formed in said at least one mounting base portion are aligned with said plurality of plugs and said plurality of fasteners extend into said plurality of third apertures and into said plurality of plugs to mount said door shelf assembly to said tailgate of said vehicle.

25. A door shelf assembly for a vehicle, comprising:
   at least one mounting base portion operably connected to the vehicle;
   at least one shelf rotatably connected to the mounting base portion and moveable between at least an open position and stowed position, said at least one shelf fitting within a footprint of said at least one mounting base portion when in the stowed position; and at least two tabs inserted into at least two apertures, respectively, provided in a surface of said vehicle for mounting the door shelf assembly to the vehicle;

wherein rotating the shelf to the open position selectively provides a utility shelf or storage bin, when desired.

26. The door shelf assembly of claim 25, further comprising a prop rod that is operably biased to automatically deploy when not held by said retainer, said prop rod including at least one storage bin operably connected to said prop rod that expands with deployment of the prop rod.

27. The door shelf assembly of claim 25, further comprising at least one storage member, said storage member selectively removable from said door shelf assembly to expose a top surface of said at least one shelf for a utility shelf mode.

28. The door shelf assembly of claim 25, wherein said at least one shelf and at least one mounting base portion is formed of a strong, durable polymer material.

29. The door shelf assembly of claim 25, further comprising at least one plug inserted into at least one aperture provided in a surface of said vehicle for mounting the door shelf assembly to the vehicle.

30. The door shelf assembly of claim 25, wherein said door shelf assembly provides no-drill installation, said door shelf assembly further comprising:
   a plurality of tabs insertable into a plurality of apertures, respectively, provided on an inward tailgate surface of said vehicle;
   a plurality of plugs insertable into a plurality of second apertures, respectively, provided on an inward tailgate surface of said vehicle;
   providing a plurality of fasteners;
   wherein inserting said plurality of tabs into said plurality of apertures partially mounts said mounting base portion to said tailgate surface, and
   wherein with said plurality of plugs inserted into said plurality of second apertures, a plurality of third apertures formed in said at least one mounting base portion are aligned with said plurality of plugs and said plurality of fasteners extend into said plurality of third apertures and into said plurality of plugs to mount said door shelf assembly to said tailgate of said vehicle.

31. A door shelf assembly for a vehicle, comprising:
at least one mounting base portion operably connected to the vehicle;
at least one shelf rotatably connected to the mounting base portion and moveable between at least an open position and stowed position, said at least one shelf fitting within a footprint of said at least one mounting base portion when in the stowed position; and
wherein rotating the shelf to the open position selectively provides a utility shelf or storage bin, when desired;
wherein said door shelf assembly provides no-drill installation, said door shelf assembly further comprising:
   a plurality of tabs insertable into a plurality of apertures, respectively, provided on an inward tailgate surface of said vehicle;
   a plurality of plugs insertable into a plurality of second apertures, respectively, provided on an inward tailgate surface of said vehicle;
   providing a plurality of fasteners;
   wherein inserting said plurality of tabs into said plurality of apertures partially mounts said mounting base portion to said tailgate surface, and
   wherein with said plurality of plugs inserted into said plurality of second apertures, a plurality of third apertures formed in said at least one mounting base portion are aligned with said plurality of plugs and said plurality of fasteners extend into said plurality of third apertures and into said plurality of plugs to mount said door shelf assembly to said tailgate of said vehicle.

* * * * *